J. Cummings,
Stuffing-Box.
N° 25,955.   Patented Nov. 1, 1859.
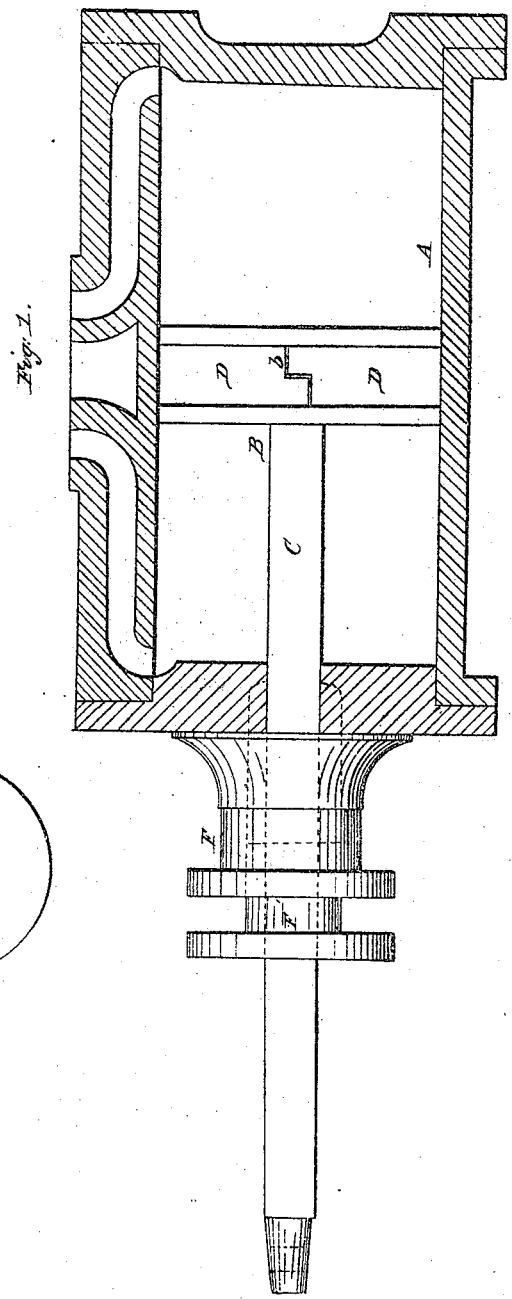

UNITED STATES PATENT OFFICE.

JAMES CUMMING, OF BOSTON, MASSACHUSETTS.

STEAM-ENGINE.

Specification of Letters Patent No. 25,955, dated November 1, 1859.

*To all whom it may concern:*

Be it known that I, JAMES CUMMING, of Boston, in the county of Suffolk and State of Massachusetts, have invented a new and useful Improvement in Steam-Engines; and I do hereby declare that the following is a full, clear, and exact description of the same, reference being had to the accompanying drawings, forming a part of this specification, in which—

Figure 1 is a vertical longitudinal section of a steam engine cylinder which may be used either for a stationary horizontal engine or an oscillating engine. Fig. 2 is a transverse section of the same.

Similar letters of reference, in each of the several figures, indicate corresponding parts.

My invention relates particularly to horizontal stationary engines and oscillating engines, but may be beneficially employed on upright or oblique engines.

In the use of a round piston and a cylinder having a circular bore, great inconvenience is experienced from the bore of the cylinder wearing untrue or elliptically, resulting, in horizontal engines, from the gravity of the piston, and in oscillating engines both from the gravity of the piston and reciprocating action of the unguided cylinder.

The invention which I think I have developed is the rendering practicable and utile the working by steam of an engine which employs a square piston chamber, and to do this I have combined with said square chamber a square piston which is formed of a series of angular sections of packing joined loosely together by lap joints, made adjustable by set screws and kept steam tight by means of springs, and I have also made the piston rod and stuffing box in which said rod works, square, all as hereinafter set forth.

To enable others, skilled in the art, to make and use my invention, I will proceed to describe its construction and operation.

A, represents that part of the engine heretofore known as the cylinder and which I shall, in this specification, name the steam piston chamber. This chamber is constructed with steam passages, the same as ordinary cylinders, but differs from such cylinders in having flat sides.

B, is the piston. Its body $a$, is made solid or chambered as represented, and attached fast to the piston rod C, in the usual manner. On the sides of the body, are arranged a series of elbow shaped or other suitable sections D, D, D, D, of metallic packing said sections uniting with one another so as to entirely close in the body $a$, by lap joints as shown at $b$. Between the packing and the body, springs $c$, $c$, $c$, $c$, are placed, said spring being connected to the body $a$, by means of female nuts $d$, $d$, $d$, $d$, and adjusting screws $e$, $e$, $e$, $e$, and bearing against the packing through projections $f$, $f$, on the packing sections in a manner to cause the same to always present an even surface to the sides of the cylinder at all points. By having the piston thus packed, the wear between it and the cylinder can be readily compensated for as will be presently shown.

E, E, E, E, are lap pieces placed across the lap joints of the packing. Each of these lap pieces is attached, by one end, fast to one of the sections of the packing and by its other end connected to another section of the packing by means of a screw $s$ which plays in an oblong slot formed in the lap piece. The object of these lap pieces is to close up the space which exists between the ends of the packing sections when an extension in the packing, to compensate for wear, is made.

F, is a stuffing box particularly designed for oscillating engines. Its "gland" F′, is made with flat sides internally, but is cylindrical externally, as represented in Fig. 3, by dotted lines.

From the above description of parts, it will be seen that if my invention is used on horizontal or nearly horizontal stationary engines the gravity of the piston will produce an equal wear over the entire surface of the bottom of the piston chamber, and that by turning the screw $e$, of the lower packing sections the said sections will be forced downward and said wear effectually compensated for; whereas with a cylinder having a circular bore and provided with a circular piston having ring packing this is not the case, because the gravity of the piston causes the cylinder to wear away at its bottom in such a manner as to elongate the bore and give it a form approximating to a cylindroid, with which form it is evident that circular packing rings, by being extended, will not conform so as to pack the piston and cylinder steam tight, and therefore disastrous leakage ensues, unless the cylinder is removed and again bored true, to do which at certain localities occasions great expense and delay. It will also be evident that if my invention is applied to an oscillating engine the gravity of the piston and the thrusts of the piston chamber against the piston in its circular vibrations cannot produce wear in any other manner than that which will elongate the bore and cause its bottom and top to remain flat, and that to compensate for this elongation all that has to be done is to move out the bottom and top sections of the packing by means of the adjusting screws $e$, until the piston again works steam tight, whereas with ordinary oscillating engine cylinders this cannot be accomplished for the same reason stated in treating of horizontal stationary engines. In this connection, I will remark that equal facilities for compensating for wear in the "gland" of the stuffing box, from same cause, are afforded, for as the piston rod, owing to being flat-sided, wears down the bore of the "gland" in like manner as the bore of my piston chamber is worn down a packing piece can be readily dovetailed in the gland.

The great importance of the improvements herein described will be readily appreciated by those who have been subjected to the delay and expense consequent from the untrue wearing of steam engine cylinders, in the manner described.

What I claim as my invention and desire to secure by Letters Patent, is—

1. The combination with a square piston chamber A, of a square piston which is constructed of a series of angular sections of packing D, joined loosely together by lap joints and made adjustable and kept steam tight, substantially in the manner and for the purpose set forth.

2. In combination with the above, the use of a square piston rod C, and a square stuffing box F, F', substantially in the manner and for the purpose set forth.

JAMES CUMMING.

Witnesses:
GOODWIN Y. AT LEE,
H. W. FENWICK.